(12) United States Patent
Chen et al.

(10) Patent No.: US 7,699,281 B2
(45) Date of Patent: Apr. 20, 2010

(54) MOUNTING APPARATUS FOR POWER SUPPLY

(75) Inventors: Yun-Lung Chen, Taipei Hsien (TW); Hua-Tang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 650 days.

(21) Appl. No.: 11/556,199

(22) Filed: Nov. 3, 2006

(65) Prior Publication Data
US 2008/0105808 A1 May 8, 2008

(51) Int. Cl.
*E04G 3/00* (2006.01)
(52) U.S. Cl. .............. 248/284.1; 248/299.1; 312/270.2; 312/317.1; 361/679.31
(58) Field of Classification Search .............. 248/284.1, 248/299.1; 312/270.2, 317.1, 325, 223.1, 312/223.2; 361/679.02, 679.31, 610
See application file for complete search history.

(56) References Cited

U.S. PATENT DOCUMENTS

| | | | | |
|---|---|---|---|---|
| 3,070,340 A | * | 12/1962 | Cohn | 248/284.1 |
| 6,229,696 B1 | * | 5/2001 | Lin et al. | 361/679.58 |
| 6,442,801 B1 | * | 9/2002 | Kim | 16/361 |
| 6,764,146 B2 | * | 7/2004 | Chen | 312/223.2 |
| 7,388,758 B2 | * | 6/2008 | Chen et al. | 361/801 |
| 7,433,183 B2 | * | 10/2008 | Huangi | 361/679.33 |
| 2002/0085347 A1 | * | 7/2002 | Erickson et al. | 361/685 |
| 2003/0193782 A1 | * | 10/2003 | Chen | 361/726 |
| 2005/0111169 A1 | | 5/2005 | Chen et al. | |
| 2006/0061956 A1 | * | 3/2006 | Chen et al. | 361/685 |
| 2007/0153469 A1 | * | 7/2007 | Chen et al. | 361/685 |

* cited by examiner

*Primary Examiner*—J. Allen Shriver, II
*Assistant Examiner*—Bradley H Duckworth
(74) *Attorney, Agent, or Firm*—Wei Te Chung

(57) ABSTRACT

A mounting apparatus includes a chassis (10), a bracket (20) for securing a power supply (50) therein, and a pair of first and second members (32, 34). The chassis has a plate (12). Two parallel securing pieces (126) are formed on the plate. The bracket includes two parallel side walls (24). One end portion of each of the first and second members being respectively rotatably secured on the securing pieces, the other end portion thereof being respectively rotatably secured on the side walls of the bracket.

18 Claims, 5 Drawing Sheets

MOUNTING APPARATUS FOR POWER SUPPLY

BACKGROUND OF THE INVENTION

1. Field of the Invention

The present invention relates to mounting apparatuses, and more particularly to a mounting apparatus for securing a power supply in a computer system.

2. Description of Related Art

In a computer system, a power supply is usually provided and secured with a mounting apparatus. For example, the mounting apparatus includes a chassis and a bracket. The chassis includes a rear panel and a side panel, respectively forming a plurality of supporting plates to support the power supply thereon. The rear panel defines a slot and the side panel defines a pair of locking apertures therein, and the bracket includes a first plate and a second plate. The first plate forms a hook corresponding to the slot of the chassis. The second plate forms a pair of resilient catches corresponding to the locking apertures of the chassis. In assembly, the power supply is placed on the supporting plates of the rear panel and the side panel. The hook of the first plate is rotatably engaged into the slot of the rear panel. The catches of the second plate are locked into the locking apertures of the side panel. Thus, the power supply is secured on the rear panel and the side panel of the chassis.

In the mounting apparatus described above, it is convenient to secure the power supply in the chassis. However, in some computer systems, more particularly in some mini computer systems, due to the very small inner space, it is needed to remove the power supply before removal, maintenance, and checking of electronic elements in the chassis, which is very inconvenient.

What is needed, therefore, is a mounting apparatus for a power supply which allows convenient removal, maintenance, and checking of electronic elements in a chassis of a computer system.

SUMMARY OF THE INVENTION

A mounting apparatus includes a chassis, a bracket for securing a power supply therein, and a pair of first and second members. The chassis has a plate. Two parallel securing pieces are formed on the plate. The bracket includes two parallel side walls. One end portion of each of the first and second members being respectively rotatably secured on the securing pieces, the other end portion thereof being respectively rotatably secured on the side walls of the bracket.

Other advantages and novel features will be drawn from the following detailed description of preferred embodiments with attached drawings, in which:

DETAILED DESCRIPTION OF THE INVENTION

Figure 1:
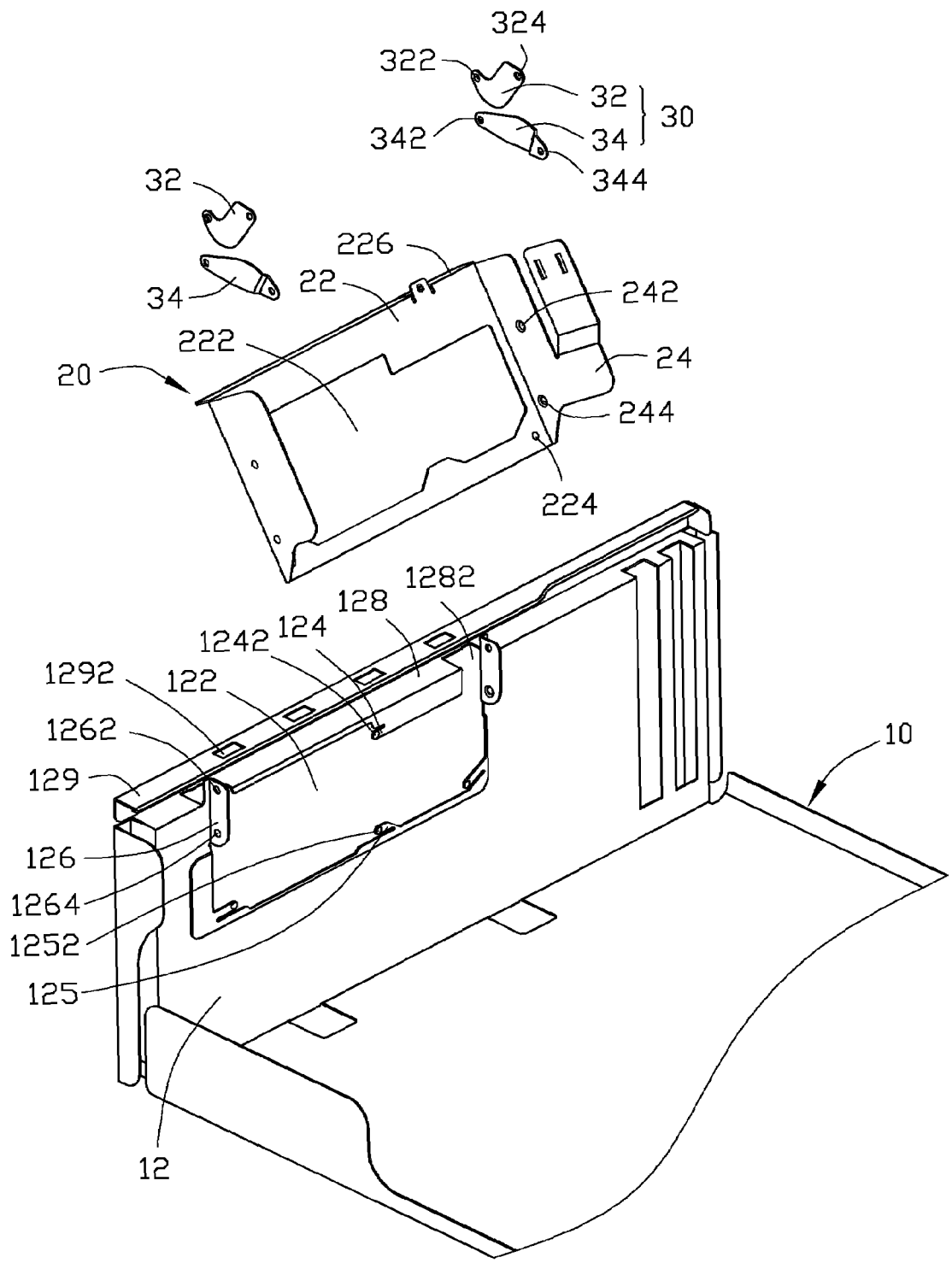
FIG. 1 is an exploded, isometric view of a mounting apparatus of a preferred embodiment of the present invention, the mounting apparatus including a chassis, a bracket, and a connecting device, the connecting device including a pair of first members, and a pair of second members.

Referring to FIG. 1, a mounting apparatus of a preferred embodiment of the present invention includes a chassis 10 of a computer system, a bracket 20 for receiving a power supply 50 (shown in FIG. 3) therein, and a connecting device 30 connected the chassis 10 and the bracket 20.

The chassis 10 has a plate 12 with an opening 122 defined therein. A plurality of resilient fingers 124, 125 extends from top and bottom edges of the opening 122. Protrusions 1242, 1252 are formed on end portions of the resilient fingers 124, 125, respectively. Two securing pieces 126 are perpendicularly bent in from two opposite side edges of the opening 122 respectively. Two pivot holes 1262, 1264 are respectively defined in each securing piece 126. The pivot hole 1262 is positioned above the pivot hole 1264. A bent flange 128 and a retaining flange 129 parallel to the bent flange 128 are formed on a top portion of the plate 12 above the opening 122. The bent flange 128 is adjacent to and above the opening 122. Two cutouts 1282 are defined in the bent flange 128 connecting the opening 122, respectively adjacent the securing pieces 126. A plurality of spaced positioning holes 1292 is defined in the retaining flange 129.

The bracket 20 includes a bottom wall 22, and two side walls 24 perpendicular to the bottom wall 22. An opening 222 is defined in the bottom wall 22, corresponding to the opening 122 of the plate 12 of the chassis 10. A plurality of mounting holes 224 is defined in the bottom wall 22. A support flange 226 is perpendicularly bent out from an edge of the bottom wall 22. Each side wall 24 defines two pivot holes 242, 244 therein.

The connecting device 30 includes a pair of first members 32, and a pair of second members 34. The first members 32 are generally L-shaped, and each defines two pivot holes 322, 324 in two end portions respectively. The second members 34 are generally step-shaped, and each defines two pivot holes 342, 344 in two end portions respectively.

Figure 2:
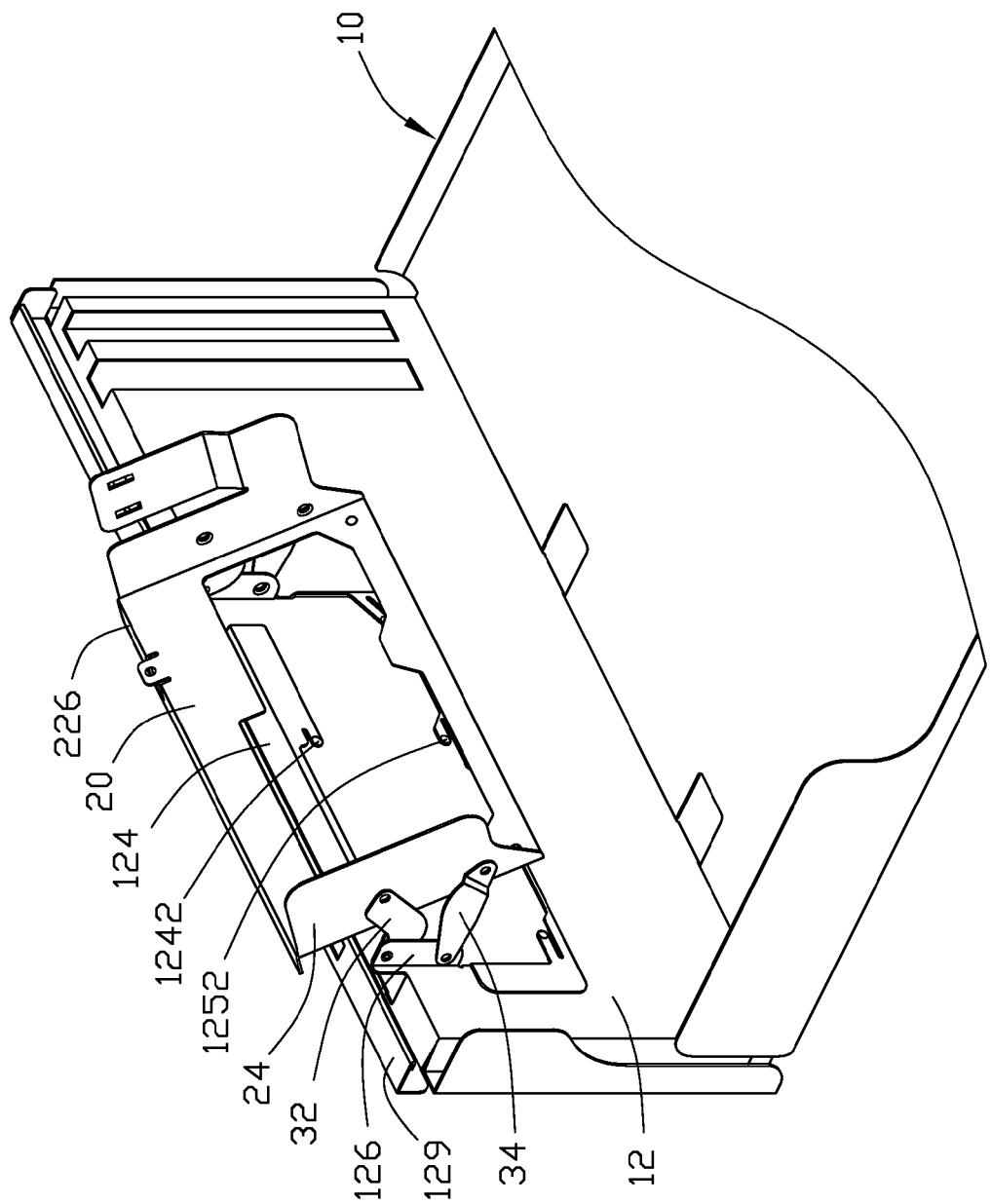
FIG. 2 is an assembled view of FIG. 1.

Referring also to FIG. 2, in assembly, the first members 32 of the connecting device 30 are placed between and respectively attached to adjacent sides of the securing pieces 126 of the plate 12. The pivot holes 322 of the first members 32 align with the pivot holes 1262 of the securing pieces 126, respectively. Two securing members (not shown), such as screws or rivets, are secured into the pivot holes 322, 1262, thereby rotatably securing the first members 32 on the securing pieces 126. The second members 34 are respectively attached to other sides of the securing pieces 126 of the plate 12. The pivot holes 342 of the second member 34 align with the pivot holes 1264 of securing pieces 126, respectively. Two securing members (not shown), such as screws or rivets, are secured into the pivot holes 342, 1264, thereby rotatably securing the second members 34 on the securing pieces 126. The bracket 20 is placed in the chassis 10. The first members 32 and the second members 34 are positioned on outer sides of the side walls 24 of the bracket 20, respectively. The pivot holes 324 of the first members 32 align with the pivot holes 242 of the side walls 24. The pivot holes 344 of the second members 34 align with the pivot holes 244 of the side walls 24. Securing members (not shown), such as screws or rivets, are secured into the pivot holes 242, 324 and the pivot holes 244, 344. So that the first and second members 32, 34 are rotatably secured on the side walls 24. The bracket 20 thus connects the plate 12 with the connecting device 30. The first and second members 32, 34 can be rotated synchronously relative to the securing pieces 126 of the plate 12, and the side walls 24 of the bracket 20.

Figure 3:
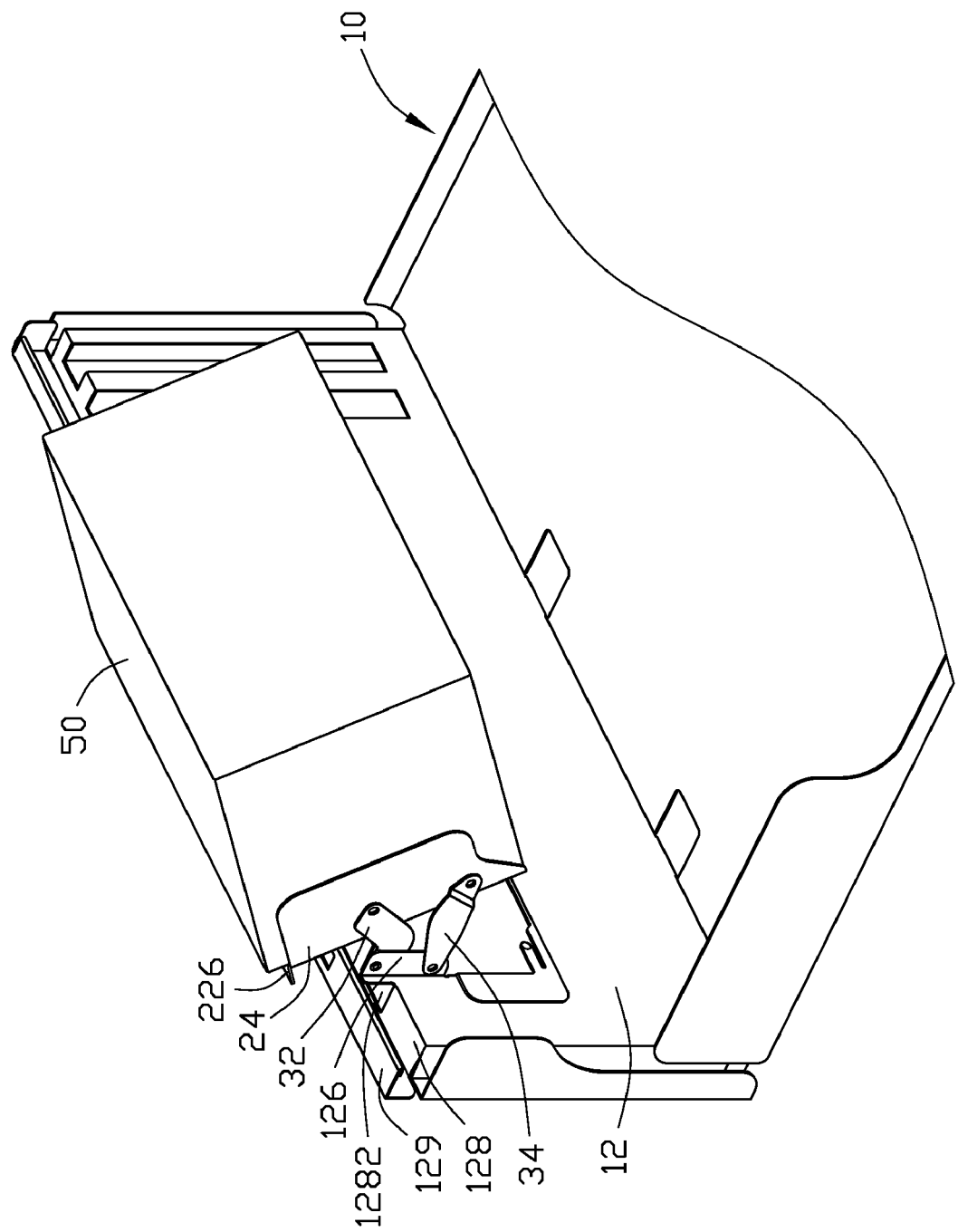
FIG. 3 is similar to FIG. 2, showing a power supply secured to the bracket.

Referring also to FIG. 3, the power supply 50 is placed into the bracket 20. The mounting holes 224 of the bottom wall 22 align with the mounting holes (not shown) defined in the power supply 50. A plurality of securing members (not shown), such as screws, is screwed into the mounting holes 224 of the bottom wall 22 and the mounting holes of the power supply 50. The power supply 50 is thus secured into the bracket 20.

Figure 4:
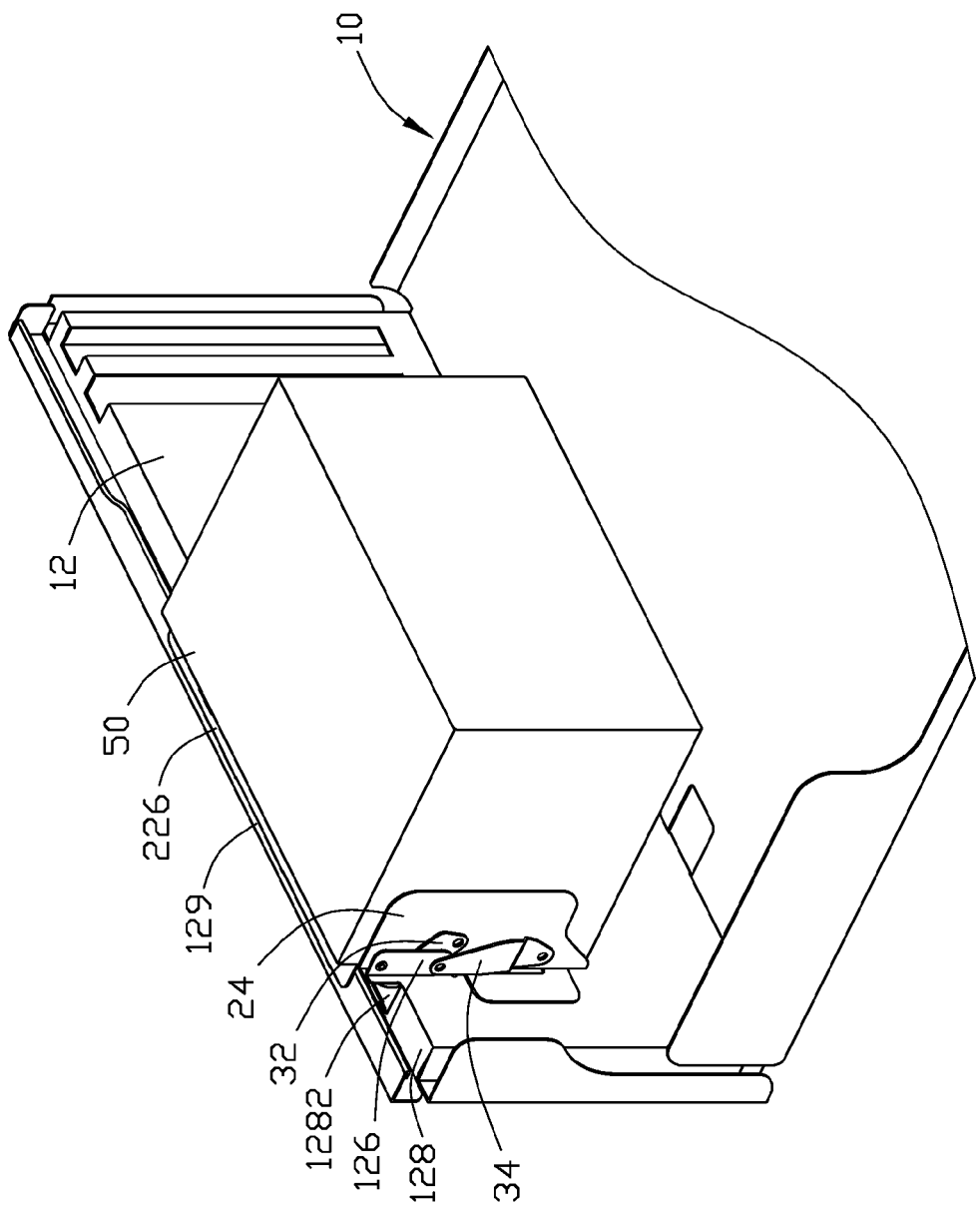
FIG. 4 is another isometric view of FIG. 3, showing the power supply in a horizontal position.
Figure 5:
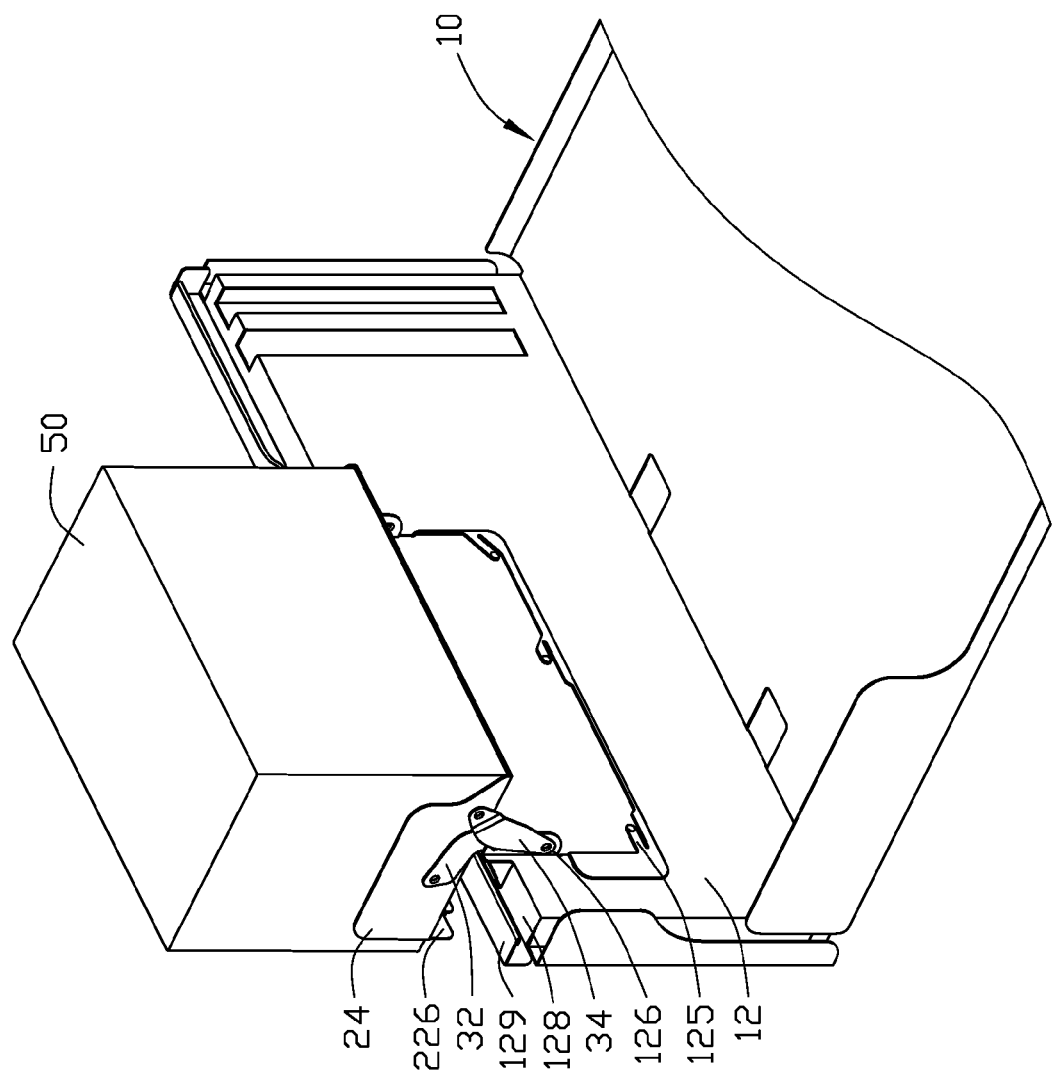
FIG. 5 is another isometric view of FIG. 4, showing the power supply in a vertical position.

The power supply 50 has a horizontal position (shown in FIG. 4) and a vertical position (shown in FIG. 5), and can be moved from the horizontal position to the vertical position. When the power supply 50 is positioned in the horizontal position, the bottom wall 22 of the bracket 20 abuts on and generally parallel to an inner surface of plate 12 of the chassis 10 and the power supply 50 is substantially located within the chassis 10. The support flange 226 of the bracket 20 abuts on the retaining flange 129 of the plate 12 of the chassis 10. A plurality of positioning tabs (not shown) formed on the support flange 226 engages into the positioning holes 1292 of the retaining flange 129 to stably position the power supply 50 in the horizontal position. The protrusions 1242, 1252 of the resilient fingers 124, 125 of the plate 12 electrically abuts on the bottom wall 22 of the bracket 20, thereby protecting the computer system from static interference. When the power supply 50 is positioned in the vertical position, the bottom wall 22 of the bracket 20 abuts on the retaining flange 129 and generally perpendicular to the plate 12 and the power supply 50 is substantially located at outside of the chassis 10. For removal, maintenance, and checking of electronic elements in the chassis 10, the power supply 50 is moved from the horizontal position to the vertical position.

Furthermore, when the power supply 50 is positioned in the vertical position, the first members 32 are engaged into the cutouts 1282 of the bent flange 128 of the plate 12, thereby preventing blocking of the first members 32 when the bracket 20 is moved to the vertical position.

Furthermore, the bracket 20 also has a horizontal position and a vertical position, corresponding to that of the power supply 50. The bottom wall 22 in the horizontal position is perpendicular to the bottom wall 22 in the vertical position.

Furthermore, the first members 32 are L-shaped in order to not be blocked by the retaining flange 129 of the plate 12 when the power supply is moved to the vertical position. The second members 34 are step-shaped in order to not interfere with the securing pieces 126 and the first members 32 when the power supply 50 is moved.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus comprising:
a chassis having a plate defining an opening, two parallel securing pieces formed on the plate from two sides of the opening;
a bracket for securing a power supply coupled to an opening therein, the bracket comprising two parallel side walls and a connecting wall perpendicular to the side walls; and
a pair of first and second members one end portion of each of the first and second members being respectively rotatably secured on the securing pieces of the plate, the other end portions thereof being respectively rotatably secured on the side walls of the bracket; wherein
the bracket is rotatable to an open position where the bracket connecting wall is generally parallel to the chassis bottom wall and is supported on the chassis plate.

2. The mounting apparatus as described in claim 1, wherein each of the first members is secured on one side of one of the securing piece adjacent to the bracket, and each of the second members is secured on the other side of one of the securing piece away from the bracket.

3. The mourning apparatus as described in claim 1, wherein a bent flange is perpendicularly formed on the plate, and defines two cutouts respectively adjacent the securing pieces, for receiving the first members to prevent the first members being blocked by the bent flange.

4. The mounting apparatus as described in claim 3, wherein a retaining flange is formed on the plate above and parallel to the bent flange, a support flange being bent from the bottom wall for abutting on the flange of the plate when the bracket is in the horizontal position.

5. The mounting apparatus as described in claim 4, wherein the retaining flange and the bent flange are perpendicular to the securing pieces.

6. The mounting apparatus as described in claim 1, wherein the first members are generally L-shaped.

7. The mounting apparatus as described in claim 1, wherein the second members are generally step-shaped.

8. The mounting apparatus as deserted in claim 1, wherein each of the first members defines two pivot holes in two end portions respectively, and each of the second members defines two pivot holes in two end portions respectively, each side wall of the bracket and the securing pieces of the chassis defining two pivot holes therein, the pivot holes of the first members respectively aligning with one of the pivot holes of the bracket and the securing pieces, the pivot holes of the second members respectively aligning with the other pivot holes of the bracket and the securing pieces.

9. A mounting apparatus comprising:
a chassis having a plate, a retaining flange being perpendicularly bent in from a top edge of the plate;
a bracket comprising a bottom wall for a power supply secured thereon; and
a connecting device moveably connected between the plate and the bracket; wherein
the bracket has a horizontal position in which the bottom wall abuts on the plate, and a vertical position in which the bottom wall abuts on the retaining flange, the bottom wall in the horizontal position is perpendicular to the bottom wall in the vertical position.

10. The mounting apparatus as described in claim 9, wherein two parallel securing pieces are formed on the plate, the bracket further comprises two parallel side walls perpendicular to the bottom wall, the connecting device comprises a pair of first and second members respectively connecting with the securing pieces and the side walls.

11. The mounting apparatus as described in claim 10, wherein each of the first members is rotatably secured on one side of one of the securing pieces, and each of the second members is rotatably secured on the other side of one of the securing pieces.

12. The mounting apparatus as described in claim 10, wherein a support flange is perpendicularly bent from the bottom wall for abutting on the flange of the plate when the bracket is in the horizontal position.

13. The mounting apparatus as described in claim 10, wherein a bent flange is formed an the plate above the securing pieces and parallel to the retaining flange, the bent flange defines two cutouts respectively adjacent the securing pieces, for receiving the first members to prevent the first members being blocked by the retaining flange.

14. The mounting apparatus as described in claim 13, wherein the retaining flange and the bent flange are perpendicular to the securing pieces.

15. A mounting apparatus comprising:
a chassis comprising a plate forming a pair of securing portions spaced from each other a retaining flange perpendicularly bent in from a top edge of the plate;
a bracket comprising a pair of side walls and a connecting wall connected between the side walls to cooperatively form a space for receiving an electronic device therein;
a pair of first connecting members pivotably connecting the side walls and the securing portions, each of the first connecting members having one end pivotably mounted to a corresponding side wall and another end pivotably mounted to one end of a corresponding securing portion at an inside side of the corresponding securing portion adjacent the bracket, and
a pair of second connecting members pivotably connecting the side walls and the securing portions respectively, each of the second connecting members having one end pivotably mounted to a corresponding side wall and another end pivotably mounted to the other end of a corresponding securing portion at an outside of the corresponding securing portion away from the bracket; wherein
the bracket is supported on the retaining flange when the bracket is pivoted to a first position at which the electronic device is substantially located at an outside of the chassis.

16. The mounting apparatus as claimed in claim 15, wherein the bracket further comprises a support flange being bent from the connecting wall for abutting on the retaining flange of the plate when the bracket is in a second position at which the electronic device is substantially located at inside of the chassis.

17. The mounting apparatus as claimed in claim 16, wherein a bent flange is formed on the plate above the securing pieces and parallel to the retaining flange, and a pair of cutouts is defined in the bent flange adjacent to the securing portions respectively for receiving the first members when the bracket is in the first position.

18. The mounting apparatus as claimed in claim 15, wherein the first members each having an L shape, and the second members each having a step for preventing interfering with the securing portions and the first members when the bracket is moved.

* * * * *